3,280,026
VISCOUS CELLULOSE ETHER COMPOSITIONS

Charles E. McCoy, Jr., Midland, Mich., assignor to The Dow Chemical Company, Midland, Mich., a corporation of Delaware
No Drawing. Filed Dec. 30, 1963, Ser. No. 334,575
8 Claims. (Cl. 252—1)

The present invention relates to a novel chemical combination for thickening aqueous systems. Particularly, the invention concerns intensifying the thickening effects achieved with certain water-soluble cellulose ethers.

Among the more effective materials for intensifying the thickening achieved in aqueous systems with water-soluble cellulose ethers are the surface active, organic sulfonates and sulfates. In many useful formulations, however, the presence of such strongly anionic surface active materials cannot be tolerated. Although surface active organic carboxylates, e.g., the fatty acid soaps such as sodium stearate, possess such activity to a degree, the maximum viscosity intensifying effects of such additives in aqueous solutions of cellulose ethers are generally less than 100 percent of the initial cellulose ether solution viscosity.

It would be desirable, and it is an object of the present invention, to provide a novel method for intensifying the viscosity of cellulose ether solutions in water. More especially, it is an object, and benefit of the invention, to provide a unique viscosity intensifying additive for aqueous cellulose ether solutions, such additive having an unexpected and most significant viscosity enhancing effect. A further object is to provide a novel thickening composition for aqueous systems. A still further object is to provide a thickening composition comprised of materials of low ionic strength. These and other objects will be manifest hereinafter as the invention is more fully described.

The invention involves the discovery that the viscosity of an aqueous solution of a water-soluble, non-ionic cellulose ether is unexpectedly intensified by incorporating into the solution an alkyl benzoate according to the formula:

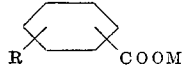

In the above formula R is a hydrocarbon alkyl containing from 11 up to 18 carbons and M is an alkali metal or ammonium group. A sufficient amount of the alkyl benzoate is incorporated into the aqueous ether solution to achieve a significant increase in solution viscosity. This is usually accomplished by employing the alkyl benzoate in an amount from about 0.05 to about 1.5 parts, preferably from about 0.4 to about 0.8 part, by weight thereof per part by weight of dissolved cellulose ether.

To carry out the invention, the cellulose ether and alkyl benzoate are admixed according to the indicated relative proportions to provide a thickening composition which is readily dispersed in the aqueous system to be thickened. In a second mode of operation, the individual components of the thickening composition are incorporated directly into the aqueous system to be thickened. After incorporating the combination into the aqueous system to be thickened, the viscosity intensifying action of the alkyl benzoate is maximized by thorough stirring. While the same effect can be achieved without the latter thorough mixing step, the attainment of the maximum viscosity in such event will normally require a substantial aging period, e.g., as much as 30 minutes or more.

The cellulose ethers employed are the non-ionic, water-soluble, alkyl, hydroxyalkyl and mixed alkyl hydroxyalkyl cellulose ether derivatives. The alkyl and hydroxyalkyl groups may contain up to 4 carbons. Specific ethers which have been prepared as water-soluble products include methyl cellulose, methyl ethyl cellulose, methyl hydroxyethyl cellulose, methyl hydroxypropyl cellulose and hydroxyethyl cellulose. In general any ether having one or more of the mentioned etherifying moieties can be used, provided it is dispersible in water to produce a visually homogeneous and infinitely water-dilutable solution. More details as to such ethers are found in Davidson and Sitting, "Water-Soluble Resins," Reinhold Pub. Corp., N.Y., 1962.

Aqueous systems that can be thickened in accordance with the present invention include a variety of aqueous solutions of inorganic salts and organic solvents miscible with water. In general any of those aqueous systems known to be thickened with cellulose ethers can be enhanced with respect to their viscosity through the employment of the alkyl benzoates of the invention.

In any given formulation the amount of the thickening combination utilized will vary, but in general useful results are obtained employing from as little as about 0.05 percent up to as much as 8 percent, or more, by weight of the thickening combination based on the weight of the aqueous system to be thickened. Of course, as will be evident to those skilled in the art, the amount of the combination required will depend in part upon the thickening properties of the cellulose ether used therein. Illustratively, cellulose ethers are available of which 2 percent by weight aqueous solutions thereof yield viscosities anywhere within the range from as little as about 10 centipoises or less up to as much as 20,000 centipoises or more.

Applications for the cellulose ethers in which the combination of the invention is useful, include the thickening of a variety of liquid adhesives such as wall paper, leather and glass fiber adhesives. Additionally the combination is useful in phenolformaldehyde glues as a thickener to prevent bleeding at the glue line. Similarly the composition is useful as a thickener for water-base inks.

In the following operations, which are illustrative of the preferred embodiments of the present invention, and its manner of utilization, water is thickened employing 1 percent of the inventive combination containing varying relative proportions of a water-soluble hydroxypropyl methyl cellulose and sodium dodecylbenzoate. The ether used contained about 1.75 methoxyl groups and about 0.23 propoxyl group per anhydroglucose residue moiety. A 2 percent by weight solution of the ether in water had a viscosity of about 4,000 centipoises.

All viscosity measurements were made with a Brookfield viscosimeter employing spindle No. 3 operated for one measurement at 6 r.p.m. and for a second measurement at 12 r.p.m. For the purposes of comparison comparative runs were also made in which the viscosity of ether solutions without the benzoate additives were measured. The results of these operations, the measured viscosities being reported in centipoises, are set forth in the following table.

TABLE

| | Formulation | | Viscosity | |
|---|---|---|---|---|
| Run No. | Cellulose Ether, percent by wt. | Na Dodecyl Benzoate, percent by wt. | At 6 r.p.m., cps. | At 12 r.p.m., cps. |
| 1 | 0.8 | 0.2 | 680 | 540 |
| 2 | 0.8 | 0 | (¹) | 50 |
| 3 | 0.7 | 0.3 | 2,760 | 2,320 |
| 4 | 0.6 | 0.4 | 12,500 | 9,210 |
| 5 | 0.6 | 0 | (¹) | (¹) |
| 6 | 0.4 | 0.6 | 120 | 80 |
| 7 | 1.0 | 0 | 280 | 300 |

¹ Solution was not sufficiently viscous for a reading.

In further experiments, it was shown that sodium nonylbenzoate and sodium tertiary butylbenzoate had essentially no effect on the viscosity of cellulose ether solutions in water. The effect described herein for the alkyl benzoates of the present invention is highly unique and entirely unexpected.

To further illustrate the efficacy of the invention, various combinations of the cellulose ether used above and monobutylphenol sodium monosulfonate, available under the trademark RWA 100, Roberts Chemical, Inc., were evaluated in a manner similar to that used above. The maximum viscosity achieved with this combination, utilizing slightly in excess of 1 percent by weight of the combination, specifically 1.15 percent by weight of the combination, based on the weight of the total solution, was 7,960 centipoises operating the brookfield viscosimeter at 12 r.p.m. The aforementioned sulfonate is one of the most effective of the known cellulose ether viscosity intensifying agents. Comparatively, the maximum viscosity intensification achieved under the invention was about 15 percent better than the effect achieved with the above sulfonate viscosity intensifying agent of the prior art and many times better than the viscosity intensification effects achieved with other surface active carboxylate soaps.

What is claimed is:

1. A composition of matter consisting essentially of one part by weight of a water-soluble, non-ionic cellulose ether selected from the group consisting of water-soluble, alkyl, hydroxyalkyl and mixed alkyl hydroxyalkyl cellulose ether derivatives, wherein the alkyl and hydroxyalkyl groups contain up to 4 carbons and from about 0.4 to about 0.8 part by weight of an alkyl benzoate according to the following formula:

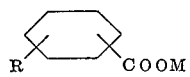

wherein R is a hydrocarbon alkyl containing from 11 up to 18 carbons and M is selected from the group consisting of alkali metal and ammonium groups.

2. A composition as in claim 1 wherein the cellulose ether is a water-soluble methyl cellulose.

3. A composition as in claim 1 wherein the cellulose ether is a water-soluble hydroxyethyl methyl cellulose.

4. A composition as in claim 1 wherein the cellulose ether is a mixed methyl hydroxypropyl cellulose ether.

5. A composition of matter consisting essentially of water and having dissolved therein a thickening amount in a range from about 0.05 up to 8 percent by weight of a combination comprising one part by weight of a water-soluble, non-ionic cellulose ether and from about 0.4 up to about 0.8 part by weight of an alkyl benzoate according to the following formula:

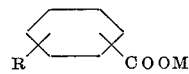

wherein R is a hydrocarbon alkyl containing from 11 up to 18 carbons and M is selected from the group consisting of alkali metal and ammonium groups.

6. A composition as in claim 5 wherein the alkyl benzoate is sodium dodecylbenzoate.

7. A composition of matter consisting essentially of water and having dissolved therein a thickening amount in a range from about 0.05 up to 8 percent by weight of a combination comprising one part by weight of a water-soluble methyl cellulose and from 0.4 up to about 0.8 part by weight of sodium alkyl benzoate wherein the alkyl contains from 1 up to 18 carbons.

8. A method for thickening an aqueous system which consists essentially of dissolving therein a thickening amount of a combination comprising one part by weight of a water-soluble, non-ionic cellulose ether and from 0.4 up to about 0.8 part by weight of an alkyl benzoate according to the following formula:

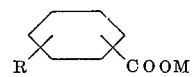

wherein R is a hydrocarbon alkyl containing from 11 up to 18 carbons and M is selected from the group consisting of alkali metal and ammonium groups.

References Cited by the Examiner
UNITED STATES PATENTS

| | | | |
|---|---|---|---|
| 2,195,198 | 3/1940 | Balle et al. | 260—515 |
| 2,492,524 | 12/1949 | Darling | 260—231 |
| 2,551,634 | 5/1951 | Price | 252—89 |
| 2,840,485 | 6/1958 | Greminger et al. | 260—231 |
| 2,892,795 | 6/1959 | Dalton | 252—138 XR |
| 2,994,665 | 8/1961 | Reich et al. | |

OTHER REFERENCES

Modocoll, "Water-Soluble Cellulose Ethers as Thickeners, Emulsifiers and Binders, Chemical Service Dept., July 1952 (pages 5 and 26 relied on).

LEON D. ROSDOL, *Primary Examiner.*

JULIUS GREENWALD, A. T. MEYERS, *Examiners.*

J. T. FEDIGAN, *Assistant Examiner.*